Figure 1:
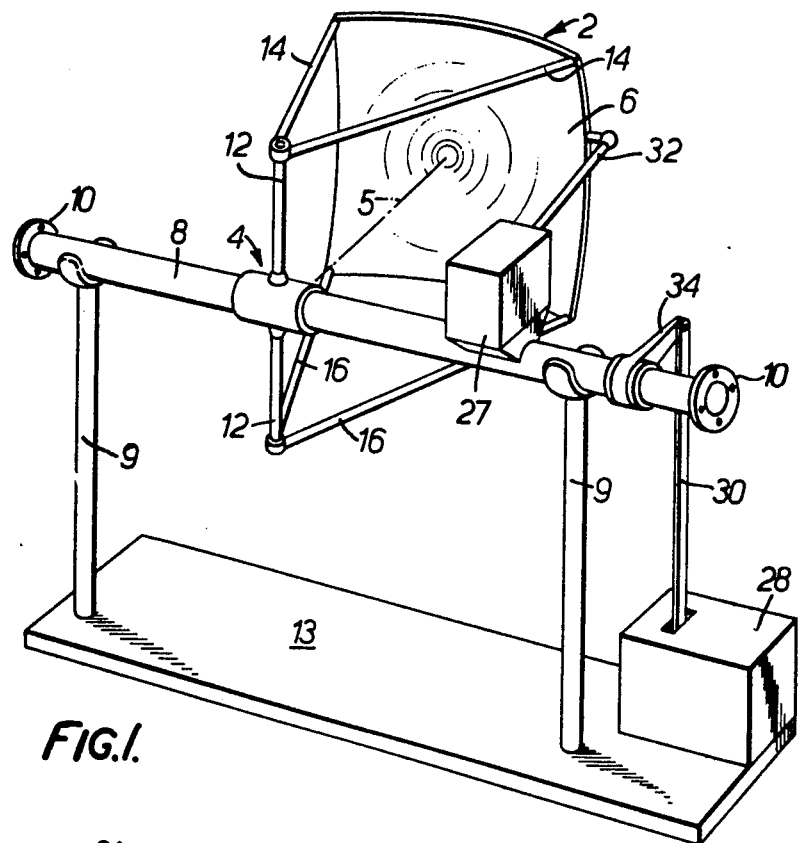

United States Patent [19]

Trihey

[11] 3,996,917
[45] Dec. 14, 1976

[54] SOLAR HEATING APPARATUS

[75] Inventor: John Massey Trihey, Bayswater, Australia

[73] Assignee: Malz Nominees Pty. Ltd., Australia

[22] Filed: Mar. 27, 1975

[21] Appl. No.: 562,425

[30] Foreign Application Priority Data

Mar. 27, 1974 Australia ............... 7059/74
Aug. 15, 1974 Australia ............... 8541/74

[52] U.S. Cl. ............... 126/270; 126/271; 250/203 R
[51] Int. Cl.² ............... F24J 3/02
[58] Field of Search ............... 126/270, 271; 250/203 R, 208, 349; 350/289, 295, 310

[56] References Cited
UNITED STATES PATENTS

| | | | |
|---|---|---|---|
| 1,946,184 | 2/1934 | Abbot | 126/271 |
| 2,141,330 | 12/1938 | Abbot | 126/271 |
| 2,182,222 | 12/1939 | Courtis et al. | 126/270 |
| 2,460,482 | 2/1949 | Abbot | 126/271 |
| 2,604,601 | 7/1952 | Menzel | 250/203 R |
| 2,646,720 | 7/1953 | Poliansky | 126/270 |
| 2,712,772 | 7/1955 | Trombe | 126/271 |
| 2,766,387 | 10/1956 | Bolsey | 250/203 R |
| 2,859,745 | 11/1958 | Brudersdorff | 126/270 |
| 3,305,686 | 2/1967 | Carter et al. | 250/203 R |
| 3,654,475 | 4/1972 | Montpas | 250/203 R |

*Primary Examiner*—John J. Camby
*Assistant Examiner*—Henry C. Yuen
*Attorney, Agent, or Firm*—Cushman, Darby & Cushman

[57] ABSTRACT

Solar heating apparatus for heating a heat transfer medium comprising a support structure, a light absorbing surface arranged to transmit heat to a heat transfer medium, focussing means mounted on said support structure for focussing solar energy upon the light absorbing surface, and tracking means for tracking movement of the sun and moving the focussing means relative to the support structure to maintain the solar energy focussed upon the light absorbing surface.

11 Claims, 13 Drawing Figures

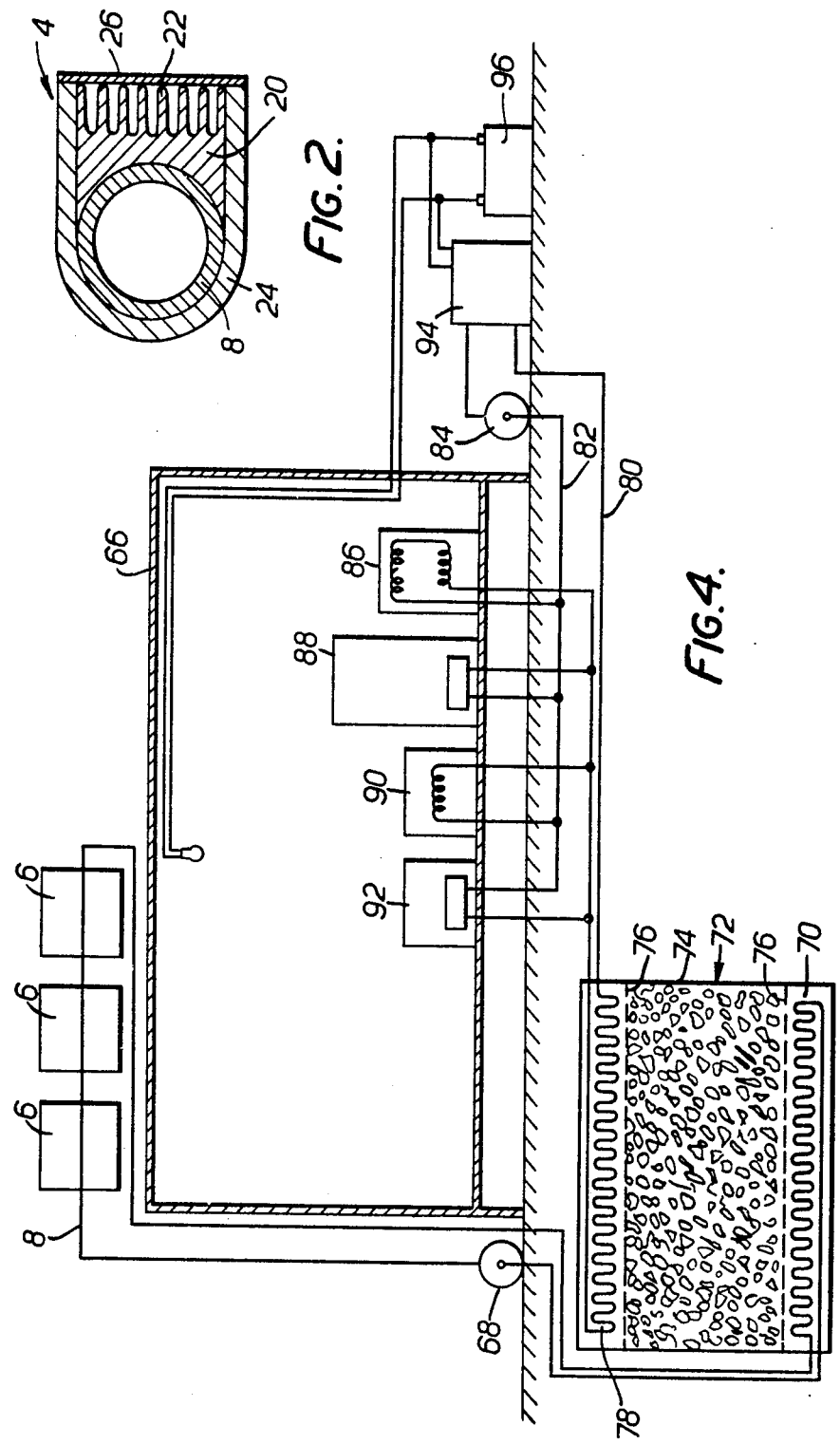

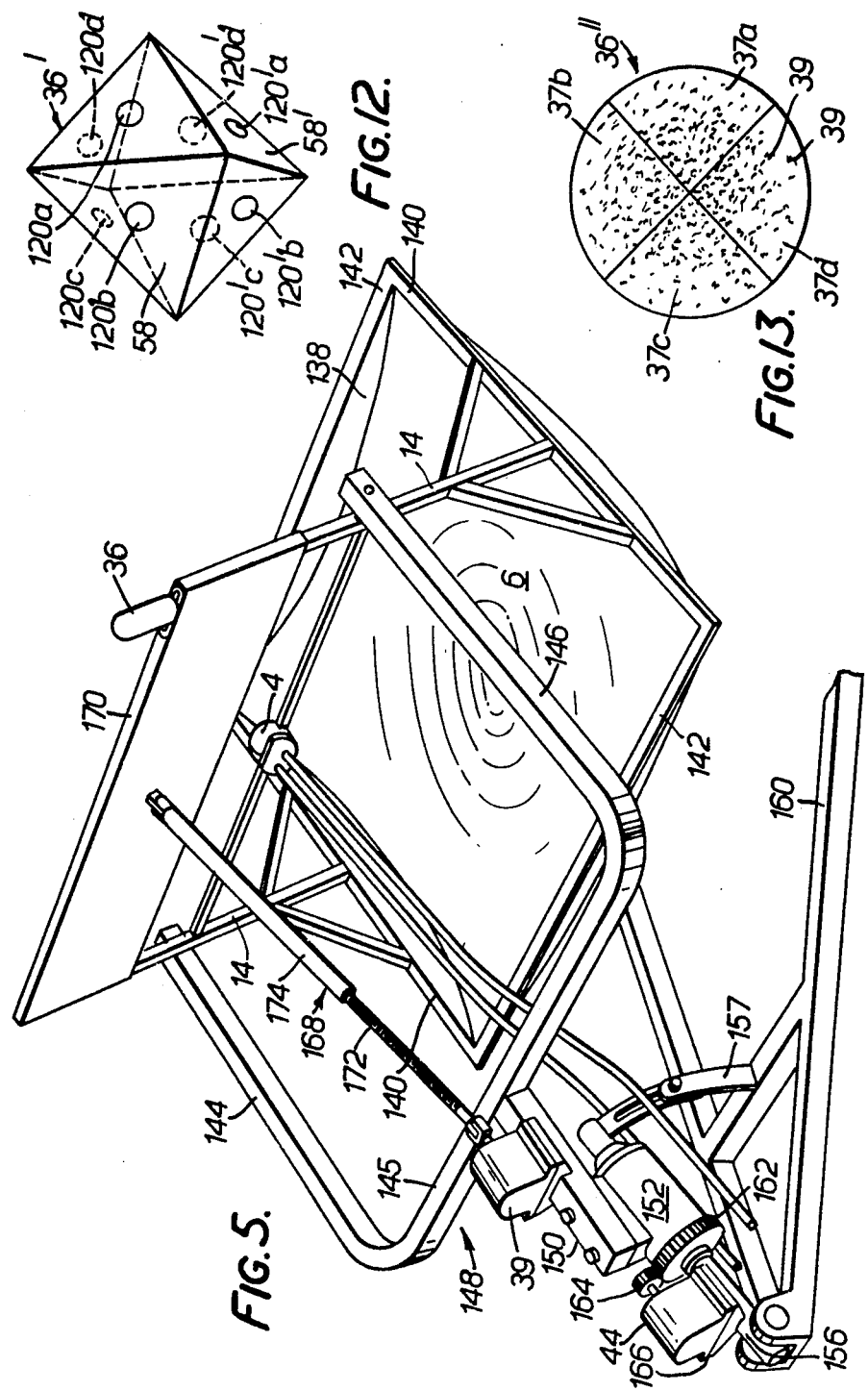

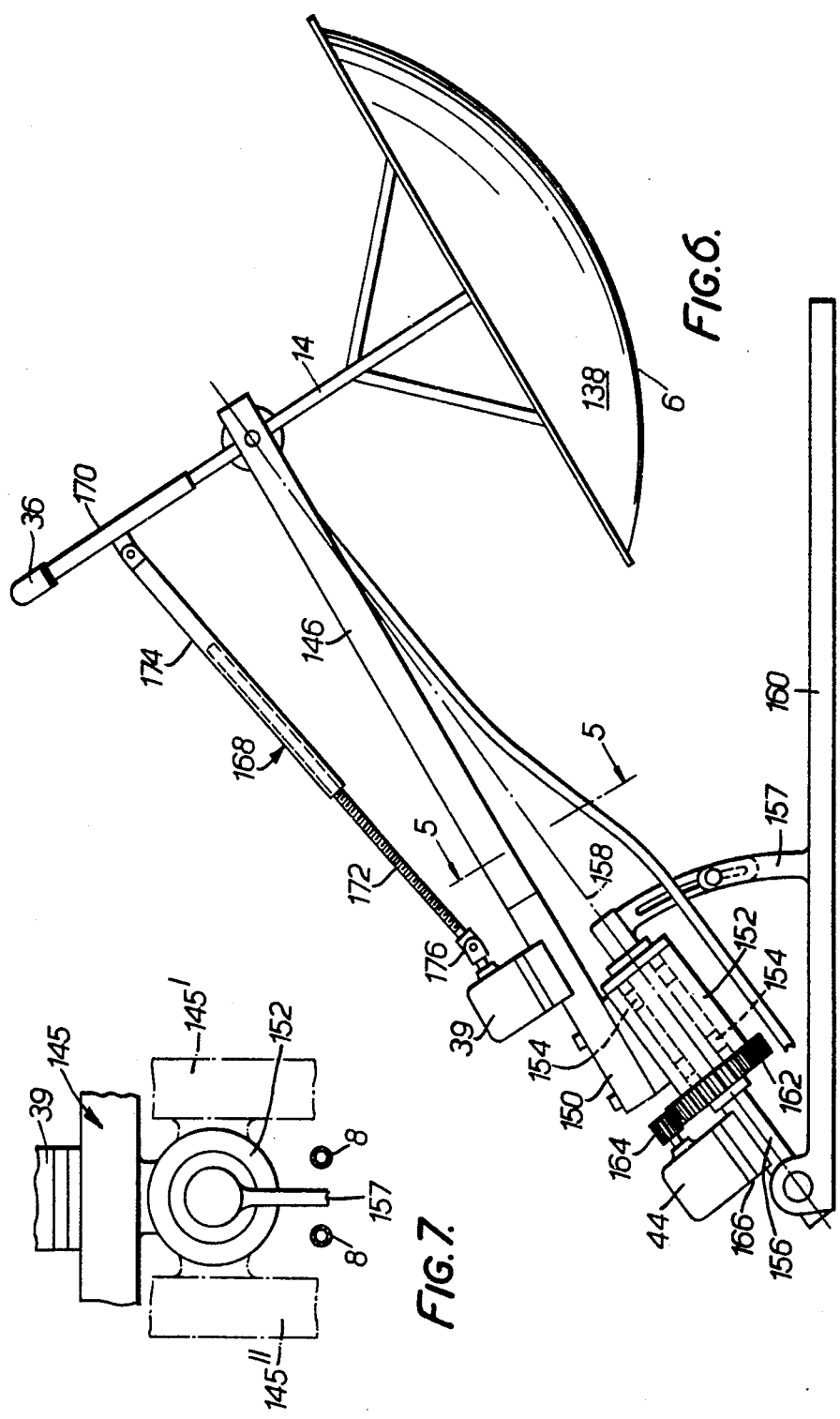

SOLAR HEATING APPARATUS

This invention relates to devices for harnessing solar energy.

It is a primary concern of the invention to enable inexpensive, relatively unsophisticated apparatus to be used to supply heat energy for domestic or industrial applications. Once the heat has been generated it may then be transmitted through a heat transfer medium, such as oil, to a heat storage tank. Such a tank may comprise a relatively large volume of crushed rock contained within an insulated tank through which the heat transfer medium flows. Heat stored in the tank can then be used directly for heating purposes, converted into electric energy, used to power heat engines, or absorbtion apparatuses such as refrigerators.

According to the present invention there is provided a solor heating apparatus for heating a heat transfer medium comprising a support structure, a solor energy absorbing surface arranged to transmit heat to a heat transfer medium, focussing means mounted on said support structure for focussing solar energy upon the light absorbing surface, and tracking means for tracking movement of the sun and moving the focussing means relative to the support structure to maintain the solor energy focussed upon the light absorbing surface.

In one important form tracking means causes the focussing means to rotate about first and second mutually perpendicular axes, whereby the sun may be tracked in both azimuth and elevation, thereby increasing the efficiency of energy conversion.

In another important form the solar energy absorbing surface is fixed with respect to the support structure so that fixed heat transfer conduits can be used throughout, thereby avoiding problems associated with providing flexible or rotary high temperature couplings. It is preferred that the apparatus includes support means for the solar-energy absorbing surface, said support means including bearing surfaces of complementary configuration to the solar energy absorbing surface, said bearing surfaces surrounding said solar energy absorbing surface to form a spherical bearing therewith, said support means being mixed in position relative to said focussing means, to support the solar energy absorbing surface. The support means can be formed from insulating material to thermally insulate the solar energy absorbing surface and thereby reduce heat losses therefrom.

In another important form the focussing means has a principal optical axis and the tracking means comprises sensing means for sensing mis-orientations between the principal optical axis and the direction of the sun and drive means responsive to the sensing means and operable to move the focussing means relative to the support structure to a position in which its principal optical axis is aligned with the direction of the sun. The sensing means may have an optical axis which is arranged to be parallel with the principal optical axis of the focussing means, said sensing means including a pair of heat or light sensitive elements disposed on opposite sides of said axis the elements being exposed to a different degree of solar radiation when the optical axis of the sensing means is mis-aligned with the direction of the sun. A second pair of heat or light sensitive elements is provided, the arrangement being such that the first and second pairs of elements lie upon first and second lines respectively which lines are perpendicular to one another and to the optical axis of the sensing means whereby said first pair of elements produce signals representative of mis-alignment of the direction of the sun relative to the optical axis of the sensing means in a first plane which contains said first line and the optical axis of the sensing means, and wherein said second pair of elements produce signals representative of mis-alignment of the direction of the sun relative to the optical axis of the sensing means in a second plane which contains said second line and the optical axis of the sensing means, so as to enable tracking of the sun in both azimuth and elevation.

The invention also provides a heat or light sensitive head for use in tracking a source of heat or light, said head comprising a plurality of heat or light sensitive elements arranged in spaced relation about a principal axis of the head, said head including means for causing the elements to be irradiated in a predetermined manner when the principal axis of the head is directed at the source and causing the elements to be irradiated in a manner which is different from said predetermined manner, when the principal axis of the head is not directed at the source.

Figure 3:
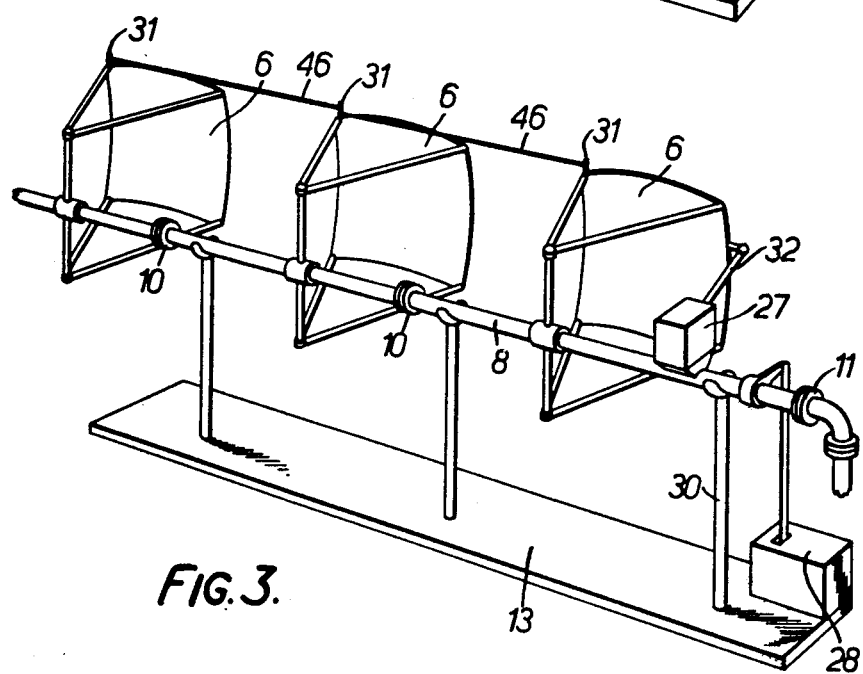
Figure 8:
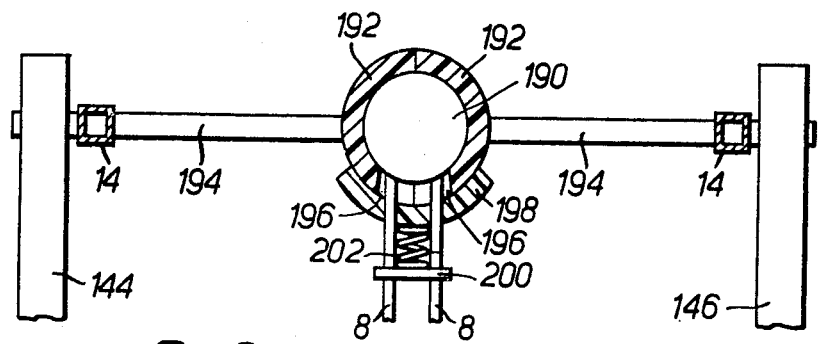
Figure 9:
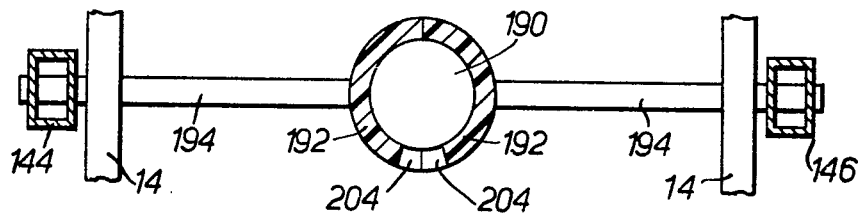

The invention will now be further described with reference to the accompanying drawings, in which:

FIG. 1 shows a perspective view of a basic form of the apparatus,

FIG. 2 shows a cross-sectional view through a heat absorbant target which forms part of the apparatus shown in FIG. 1, FIG. 3 shows a perspective view of an apparatus having multiple reflectors and targets, FIG. 4 shows a domestic application of the apparatus, FIG. 5 is a perspective view of a preferred embodiment of the invention, FIG. 6 is a side view of the apparatus shown in FIG. 5, FIG. 7 is a cross-sectional view along the line 5—5 marked on FIG. 6, FIGS. 8 and 9 are plan and side views of the target which forms part of the apparatus shown in FIG. 5, FIGS. 10 to 13 diagrammatically show novel tracking heads.

The device illustrated in FIG. 1 comprises light focussing means 2 for focussing solar energy upon a solar energy absorbing target 4 located at the focal region of the focussing means 2. The focussing means 2 may comprise a convex lens, Fresnel lens, or parabolic reflecting surface, in which case the focal region will comprise a relatively sharp point. The focussing may however comprise a cylindrical lens or reflecting surface, in which case, the focal region will comprise a line. The illustrated arrangement shows the focussing means in the form of a reflecting surface 6 which has the shape of a paraboloid revolution. The reflecting surface 6 may conveniently be pressed from a square sheet of aluminium or other highly reflective metal. It may be coated with corrosion resistant materials so that its reflective properties are maintained. Small drainage holes may be punctured through the surface 6 to permit rain water to drain therethrough. Alternatively, it may have a flat sheet of glass extending across its front and hermetically sealed to the peripheral edges of the surface, and have the space between the glass and the surface filled with an inert gas to avoid surface deterioration of the surface 6. Alternatively, the glass may be curved to closely conform to the shape of the reflecting surface 6, or if desired directly mirrored.

Light which impinges upon the reflecting surface 6 and is parallel to its optical axis will be reflected through the focus of the surface 6. For effective operation, it is important to ensure that the optical axis 5 of the surface 6 is pointed directly at the sun and for this reason it is necessary to move the surface 6 so that this relationship is maintained. In accordance with the invention, the focus of the surface 6 is located at a fixed point in space therefore making it possible for the target to be stationary. In the arrangement illustrated in FIG. 1, the target 4 is not truly stationary since it is arranged to rotate about a horizontal axis as the sun is tracked, enabling simple support and movement of the focussing means 2, as will be described below. The target 4 is mounted upon or forms part of the surface of a conduit 8 for a heat transfer fluid, the conduit 8 being mounted horizontally in a pair of yokes 9 which permit the conduit 8 to rotate about its longitudinal axis. The yokes are connected to a base structure 13 which can be mounted upon a roof or other fixture at the side of the apparatus. Two opposed support rods 12 project radially from the conduit 8 (in an ideal apparatus, an imaginary line joining the adjacent ends of the rods 12 would pass through the focus of the surface 6). Pivotally connected to the outer ends of the rods 12 are upper and lower pairs of adjustable support arms 14 and 16. The ends of the arms 14 and 16 remote from the rods 12 support respective corners of the surface 6. Thus, the surface 6 is supported by the conduit whereby rotation of the conduit 8 about its axis will cause a corresponding rotation of the surface 6 about the same axis. The surface 6, however, can rotate relative to the conduit 8 by virtue of the pivotal connection of the arms 14 and 16 of the rods 12. It is desirable to include in the arms 14 weak-points which will fail under strong wind conditions to thereby effectively restrict damage to the arms 14 and surface 6 and prevent more serious damage to the remainder of the apparatus.

The conduit 8 is provided at its ends with flanges 10 to enable coupling to similar conduits 8 or to an end coupling 11, as seen in FIG. 3. The end coupling 11 must permit rotation of the conduits 8 and still maintain sealing contact therewith.

In operation, a heat transfer liquid, such as oil, is pumped through the conduit 8 so that it is heated on passing the target 4 which has intense solar energy focussed upon it. FIG. 2 shows one form of target which comprises a thermally conductive body 20 in intimate contact with the conduit 8. The body 20 has a finned heat absorbent surface 22 onto which the sun's rays are focussed by the surface 6. The body 20 and the conduit 8 are mounted in an open faced housing 24, the open face of which is spanned by a transparent protective sheet 26. The space between the absorbant surface 22 and the sheet 26 is filled with an inert transparent gas, or evacuated, to prevent oxidation of the surface 22, and to reduce heat losses therefrom by conduction and convection. In an alternative construction the heat absorbant surface 22 is part cylindrical in shape, and its axis is perpendicular to both the axis of the conduit 8 and the optical axis 5 of the surface 6. With this construction, the surface 6 can be rotated about an axis which is co-incident with the axis of the cylindrical target surface 22, whereby, if the focus of the surface 6 is initially on the cylindrical target surface, during subsequent rotations of the surface 6, the focus will always remain on the cylindrical surface.

The focussing means 2 must be moved so that the optical axis 5 is always directed at the sun so that a very high temperature is established and maintained at the heat absorbant surface 22. For this purpose tracking means is provided and will be described in more detail below. The apparatus includes a base structure 13 which is mounted such that the conduit 8 is horizontal and extends in a north-south direction so that rotation about the axis of the conduit can be used for elevation tracking of the sun. For complete tracking of the sun in elevation, 180° of movement of the conduit 8 about its axis is sufficient movement for the optical axis 5 of the surface 6 to track the sun from its rise at the eastern horizon, during the day until its setting at the western horizon. However, it is preferred to permit 360° of rotation of the surface 6 so that it can be caused to enter an inverted position, with the optical axis 5 directed downwards, to prevent dew formation upon the surface 6.

With regard to tracking in azimuth, the extent of rotation required of the surface 6 about the rods 12 depends upon the latitude of the place where the apparatus is to be set up. In general, the greater the distance from the equator, the greater the range of rotation required for azimuth tracking.

The tracking means includes an elevation mechanism 28 mounted upon the base structure 13 and provided with an arm 30 pivotally connected to a flange 34 mounted upon the conduit 8. Movement of the arm 30 causes the conduit 8 to rotate about its axis and thus movement of the arm 30 controls the elevation angle of the optical axis 5 of the surface 6. The tracking means includes an azimuth tracking mechanism 27 mounted upon the conduit 8 and having an arm 32 pivotally connected to the surface 6. Movement of the arm 32 causes the surface 6 to rotate about the axis of the rods 12 and thus controls the azimuth angle of the optical axis of the surface 6. The tracking mechanisms must therefore be capable of moving the arms 30 and 32 in such a way that the optical axis of the surface 6 correctly follows the elevation and azimuth angles of the sun.

In one form the tracking means may include motor driven cams arranged to cause the arms 30 and 32 to follow paths appropriate for causing the surface 6 to follow the sun during a day. These cams would need periodic adjustment by a further cam to account for the seasonal changes in the sun's path. To this end a crystal clock could be provided and arranged to make daily adjustments to the cam to ensure correct following of the sun throughout the year.

FIG. 3 shows a series of reflecting surface 6 having their associated conduits 8 connected in series to inpart more heat to the heat transfer fluid. A single tracking means can be employed to operate all surfaces 6 in the series because movement of the arm 30 will produce simultaneous rotation of all conduits 8 since they are interconnected by their flanges 10. Simultaneous azimuth movement can be effected by providing arms 46 pivotally extending between adjacent spigots 31, located upon the surfaces 6.

FIG. 4 illustrates a domestic application of the solar heating apparatus of the invention. A building 66 has three interconnected surfaces 6 mounted on its roof with their transfer fluid conduits 8 connected in series. A pump 68 pumps the fluid through the conduits 8 and through a heat exchanger 70 located at the bottom of a heat store 72. The heat store comprises a thermally insulated subterranean tank 74 having grids 76 the space between which is filled with a heat storing medium such as crushed rock. The tank 74 is then filled with oil such as reclaimed sump oil to make it void free and enhance heat transfer with the heat exchanger 70.

A second heat exchanger 78, located in the tank 74 above the upper grid 76 is provided to enable heat to be withdrawn from the store 72. The exchanger 78 is connected in a circuit which includes a supply duct 80 return duct 82 and circulating pump 84. The supply duct is arranged to supply heat to such devices as a stove 86, absorption refrigerator 88, heater 90 or absorbtion cooler 92. It also supplies heat to a motor generator set 94 which is arranged to charge a battery 96. Electric power from the battery 96 is used for lighting purposes, electronic equipment, such as radios, and for driving the pumps 68 and 84 and the solar tracking devices for the reflecting surfaces 6.

In an alternative form light from the sun could be collected and used for a continuous tracking of the sun. Various forms of tracking heads, some examples of which will be described later, can be associated with the apparatus and used to produce drive signals for servo-motors for causing rotation of surface 6 in elevation and azimuth.

The arrangement described above offers the advantage in that the conduit need only have couplings which enable it to rotate, whereas if the focal point were allowed to move during tracking, complex flexible couplings would be required which enable considerable flexure in two dimensions. The modified device disclosed hereinafter has a further advantage that it has a completely stationary target and, accordingly, fixed conduits can be used for heat transfer fluid to and from the target.

The apparatus illustrated in FIGS. 5 and 7 is essentially an improved version of the basic apparatus shown in FIGS. 1 to 3, and according, the same reference numerals will be used to denote parts which are equivalent to those in the earlier arrangement.

In this arrangement, the reflecting surface 6 is integrally formed with planar side walls 138 which have integral opposed pairs of flanges 140, 142 depending therefrom. The arms 14 are connected to the flanges 140 to support the surface 6. The arms 14 are pivotally connected near their mid-points to respective legs 144, 146 of a Y-shaped support yoke 148. The lower part or stem 150 of the yoke 148 is mounted upon the top of a socket 152 within which is mounted a pair of spaced bearings 154. A shaft 156 extends into the socket 152 and, in co-operation with the bearings 154, permits the yoke 148 to rotate about an axis 158, which is co-axial with the shaft 156, axis 158 also passing through the mid-point of a line joining the ends of the legs 144, 146 of the yoke. The shaft 156 is pivotally connected to a phase 160 for rotation about a horizontal axis and a clamp 157 is provided for fixing the angular position of the shaft 156 with respect to the base 160 according to the latitude of the location where the apparatus is to be used. For instance, in Melbourne, an angle of approximately 40° is set between the shaft 156 and the base, assuming the latter is horizontally disposed.

In use of the apparatus the axis 158 is disposed in the North-South direction so that, in following the sun in elevation each day, the yoke 148 rotates through about 180° upon the shaft 156. To effect this rotation, the exterior of the socket 152 has mounted thereon a gear 162 which meshes with a driving gear 164 of an elevation servo-motor 44. In this arrangement the elevation servomotor 44 mounted upon a mounting plate 166 affixed to the shaft 156. Of course, the gears 162 and 164 could be replaced by a chain and sprocket or other form of coupling if desired.

Tracking in azimuth is accomplished by pivoting the arms 14 about their pivotal connections to the legs 144, 146 of the yoke. An extensible rod 168 is pivotally connected at one end to counter balance plate 170 mounted between the arms 14 and at the other end, to a point which is fixed with respect to the base 160, whereby changes in the length of the rod 168 cause rotation of the arms 14 relative to the yoke 148, regardless of the angular position of the latter with respect to the shaft 156.

The extensible rod comprises a shaft 172 and a tubular portion 174 the upper end of the shaft 172 being screw-threaded and threadably received within the tubular portion 174. The tubular portion 174 can rotate about in a plane which is normal to the plate 170 but is constrained from rotating about its own axis. The lower end of the shaft 172 is connected via a universal coupling 176 to an azimuth servo-motor 39 which is mounted upon the stem 150. Operation of the azimuth servo-motor 38 causes rotation of the shaft 172 and, because of the threaded connection of the shaft 172 to the tubular portion 174, the overall length of the extensible rod 168 will change, to effect the required rotation of the arms 14. The motor 39 may of course, be mounted on the shaft 156 or upon the motor 44 but mounting upon the stem 150 is preferred since in the latter arrangement the coupling 176 does not have to accommodate movements of the yoke 148.

In this arrangement, it is preferred that the target 4 has hemispherical surface or part hemispherical surface or part hemispherical surface facing the reflective surface 6. The centre of the sphere lies at the intersection of the axis 158 and the pivot axis of the arms 14 so that the reflective surface 6 rotates both in azimuth and elevation about the centre of the sphere (which is therefore fixed in space). Accordingly the target 4 can be fixed in space. It is therefore possible to support the target 4 in socket bearings which extend from the legs 144, 146 of the yoke or from the arms 14 to remove the necessity for the conduits 8 to support the target. Further, the sockets can be made from insulating material to reduce heat losses from the target.

FIGS. 8 and 9 illustrate such an arrangement in more detail. The target 4 includes a spherical light absorbing surface 190 having the conduits 8 connected thereto. Two, parts spherical sockets 192, having internal being surfaces of complementary configuration to the surface 190, are mounted upon arms 194 so that the sockets 192 and surface 190 form a spherical bearing. The sockets 192 are preferrably formed from high temperature glass fibre insulating material. The arms 194 co-linear with the axis upon which the arms 14 are pivotally connected to the arms 144, 146 so that the spherical surface 190 remains at a fixed location regardless of the orientation of the arms 14 to the arms 144, 146. As seen in FIG. 8, the sockets 192 include clearance openings 196 to permit the conduits 8 to be connected to the surface 190. To prevent heat losses through the openings 196, a part spherical cover 198 is provided, and its concave surface forms a part spherical bearing with the outer, convex surfaces of the sockets 192. In the illustrated arrangement the cover 198 is supported by the conduits 8, there being an insulated connecting piece 200 connected to the conduits 8 and a compression spring 202 which acts between the connecting piece 200 and the convex surface of the cover 198 to force the latter into engagement with the sockets 192. As best seen in FIG. 9, the sockets 192 also include windows 204 to permit solar energy to be focussed upon the surface 190 by the focussing means 2.

The diameter of the hemispherical surface 190 and the focal length of the reflecting surface 6 are chosen so that the focus of the reflecting surface 6 always lies upon the hemispherical surface 190 regardless of the orientation of the former.

FIGS. 6 and 7 show the preferred disposition of the conduits 8. Starting from the target 4, the conduits 8 first extend in the vicinity of the axis 158 to the socket 152. Near the junction of the legs 144, 146 of the yoke, the conduits 8 extend downwardly so that they then extend beneath the stem 150 and the socket 152. This disposition of the conduits 8 as described is such that they can be fixed in space without interfering with the tracking movements of the yoke 148 or the reflecting surface 6. Further, the arrangement has the advantage that it permits a full 180° of tracking in elevation, since the legs 144, 146 of the yoke will not interfere with the conduits 8 because of the off-center movement of the legs with respect to the shaft 156. As best seen in FIG. 7 when the stem 150 is directly above the shaft 156, as shown in full lines, the legs 146, 144 are well above the conduits 8; when the yoke is rotated clockwise through 90° the leg 145 joining the legs 144 and 146 assumes the position as denoted by 145' which is to the side of the conduits 8; and similarly when the yoke is rotated through 90° anti-clockwise the leg 145 assumes the position denoted by 145'' which is to the side of the conduit 8.

The apparatus illustrated in FIGS. 5 to 9 can be coupled to other similar devices for parallel operation, the apparatuses being disposed side by side or in a multitier vertical array. The sockets 152 of respective devices can be coupled together for parallel elevation tracking and the surfaces 6, arms 14 or plates 170 of respective apparatuses can be interconnected by pivoted rods to effect parallel tracking. In this way, duplication of the tracking equipment is avoided.

FIGS. 10 to 13 illustrate various forms of tracking heads 36 which can be used to control the operation of azimuth and elevation motors 39 and 44.

Figure 10:
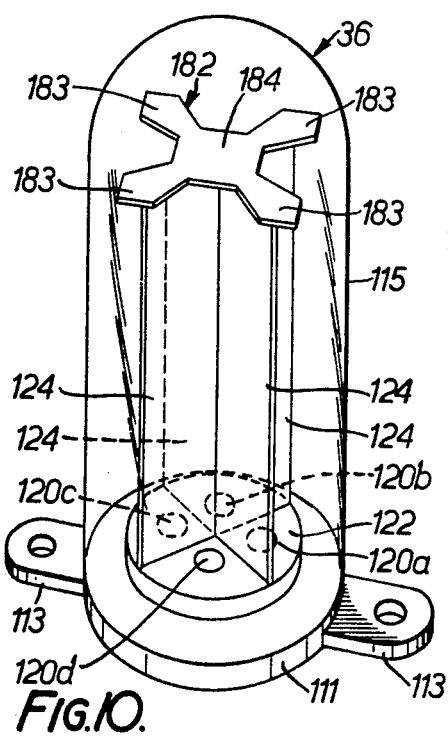
Figure 11:
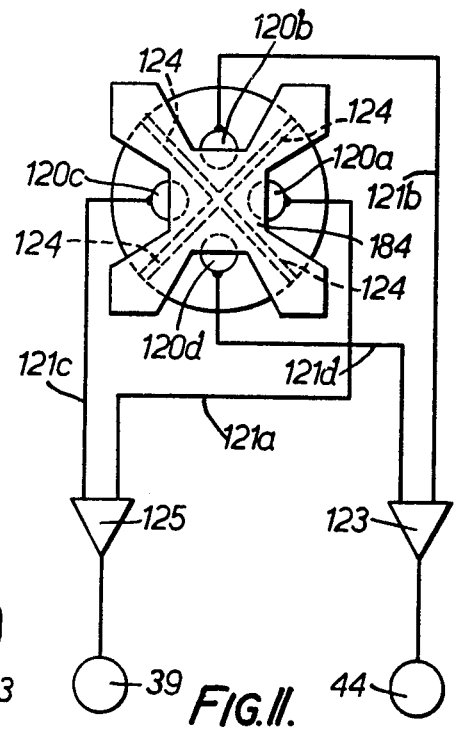

The head 36 shown in FIGS. 10 and 11 comprises a circular base 122 from which extend four reflective vanes 124 which are perpendicular to one another and to the base 122. Mounted upon the base 122 are four elements 120a, 120b, 120c and 120d which are sensitive to radiant heat or light infringing upon them. The elements 120a, 120b, 120c and 120d are symmetrically disposed between respective vanes 124. The base 122 is mounted upon a mounting bracket 11 having lugs 113 for connecting the head 36 to a convenient point on the apparatus. A glass envelope 115 is affixed to the periphery of the bracket 11 and protects the vanes 124 and elements 120 from rain and dust.

The elements 120b and 120d are connected via lines 121b, 121d to a differential amplifier 123, the output of which is used to drive the elevation motor 44. The elements 120a and 120c are connected via lines 121a, 121c to a differential amplifier 125, the output of which is used to drive the azimuth motor 39. In this arrangement the motors 39 and 44 will be un-energized when the output from the amplifiers 125, and 123 is zero, corresponding to the condition in which the quantity of heat or light received by the elements 120b and 120c equals that received by the elements 120d and 120a respectively. When the line at the intersection of the four vanes 124 is pointed directly at the sun, the amount of heat or light incident upon each element will be the same and the motors will be at equilibrium. Thus, all that need be done to make the surface 6 track the sun is to mount the head 36 in a fixed position relative to the surface 6 with its optical axis 5 parallel to the line of intersection of the four vanes 124. The head 36 could be mounted directly on the surface 6 or its periphery but is preferably mounted upon the top of the plate 170, as seen in FIG. 6. As the sun moves during the course of the day, the amount of light falling upon the elements 120 will no longer be equal and accordingly difference signals from the amplifiers 123, 125 will operate the motors 44 and 39 which will, in turn, cause the yoke 148 and the terms 14 to rotate until a new equilibrium position is reached with the light falling equally upon the four elements 120 and wherein the optical axis 5 is again pointed directly at the sun.

In order to increase the sensitivity of the head 36 to small movements of the sun, a shading element 182 is mounted upon the tops of the vanes 124. The element 182 has four legs 183 arranged in a generally cruciform array, with each leg 183 overlying one of the vanes 124. The element 182 has a square central position 184, which partially shades the elements 120 as best seen in FIG. 11. When the line at the intersection of the vanes 124 is pointed directly at the sun, all four elements 120 will be partially shaded by an equal amount, but a slight movement of the sun will have a pronounced effect upon light impinging upon the elements, since, for instance, for a small elevational movement of the sun, the element 120b would be almost fully exposed to radiation whereas the element 120d would be almost fully shaded by the portion 184. It should be appreciated of course that the central portion 184 need not be square; it could be circular, or of other configuration as long as it shades the pairs of elements 120b and 120d, and 120a and 120c to an equal degree.

The purpose of the reflective vanes 124 and the legs 183 is to enable light to be reflected onto the elements 120 at times when the axis of symmetry of the head 36 is greatly mis-aligned relative to the direction of the sun. Such mis-alignments may occur on very cloudy days when there is no intense source or region of the sky which the apparatus will follow and the sun first appears in the afternoon. The apparatus would be directed towards the East but the sun will have moved considerably and direct light may not fall upon the elements 120. The undersides of the legs 183 are made reflective and these, together with the reflective vanes 124, will be exposed to light and will reflect at least portion of the light towards the elements 120 thereby initiating tracking of the surface 6. The best place to mount the head 36 for the purpose of receiving light in the circumstances noted above is on top of the plate 170.

The apparatus is proved with a limit switch (not shown) to return the surface 6 to zero or near zero elevation angle in the easterly direction following reaching zero or near zero elevation angle in the westerly direction so that the surface 6 is in readiness for the rise of the sun on the next day. During the return movement, the afternoon azimuth position can be retained and will be substantially correct for tracking the following day. In a preferred arrangement, however, the surface 6 is arranged to be inverted at night, by control or either the elevation motor 44 or the azimuth motor 39, to prevent dew formation upon the surface 6 thereby assisting in maintaining the surface 6 clean. In such a case it would be necessary to mount the head 36 upon the periphery of the surface 6.

The head shown in FIG. 10 is simple and is inexpensive to fabricate but it is by no means the only one which will provide the necessary signals for the differential amplifiers 123, 125.

An alternative form of head 36' is shown in FIG. 12. In this arrangement, the four elements 120a 120b 120c and 120d are arranged upon faces of a pyramid support structure 58, and the elements 120b and 120d, and 120c and 120a are connected to the differential amplifiers 123, 125, as before. In this arrangement, when the axis of symmetry of the structure 58 is pointed directly at the sun, the output of the amplifiers 123, 125 will be zero. To ensure operation of the head 36' when the axis of symmetry is greatly mis-aligned with the direction of the sun, a second set of heat or light sensitive elements 120'a, 120'b, 120'c, 120'd is provided, and these elements are mounted upon the faces of a second pyramid support structure 58', the bases of the two pyramid support structures being connected together. The outputs of the elements 120a and 120'a are connected in parallel, and similarly for the remaining pairs, 120b and 120'b, 120c and 120'c, 120d and 120'd, so that when the upper elements 120 are in position to receive no sunlight, at least some of the lower elements 120' will be in a position to receive light and thereby initiate tracking.

A further modified head 36'' is shown in FIG. 13. This arrangement includes a spherical shell formed of four equal segments 37a, 37b, 37c and 37d. Each segment has connected thereto the ends 39 of a plurality of light guides which serve to gather light incident upon the shell and direct it to four light sensitive elements (not shown) which function in an analogous way to the elements 120. The arrangement is such that the four segments 37 are illuminated equally, equal signals will be produced by the light sensitive elements as required. To improve sensitivity of the head 36'', the ends of the light guides are more highly concentrated in the region of the axis of symmetry of the head, as seen in FIG. 13.

The apparatus may include many further refinements. For instance, the windows 204 may be bounded by a cone which projects outwardly from the socket 192 to reduce heat losses from the surface 190 caused by wind and to reflect light which is not properly focussed upon the surface 190 towards the latter. The apparatus may include a wiper or other form of cleaning device to give periodic cleaning of the surface 6. In a most advantageous form, the apparatus includes a wiper blade which is fixed relative to the target 4 so that the surface 6 sweeps past the wiper blade during daily tracking of the sun.

I claim:

1. Solar heating apparatus for heating a heat transfer medium comprising a support structure, a solar energy absorbing surface which is at least partly spherical arranged to transmit heat to a heat transfer medium, focussing means mounted on said support structure for focussing solar energy upon the solar energy absorbing surface, tracking means for tracking movement of the sun and for rotating the focussing means relative to the support structure about first and second mutually perpendicular axes to maintain the solar energy focussed upon the solar energy absorbing surface, and support means for said absorbing surface, said support means being fixed relative to said focussing means and mounting said absorbing surface in a fixed location relative to said support structure and immovable relative thereto and such that said first and second axes intersect at the geometric center of said absorbing surface, said support means including concave surfaces which are of complementary configuration to said absorbing surface and which surround the spherical part of said absorbing surface.

2. Apparatus as in claim 1 wherein the portion of said support means forming said concave surfaces is constructed of thermal insulating material.

3. Apparatus as in claim 1 including a support yoke connected to the support structure for rotation about said first axis, said yoke being Y-shaped and having a stem and a pair of spaced support arms connected for rotation about said second axis, said focussing means being connected to said support arms, said stem being connected to a socket, said support structure including a shaft which mates with said socket and permits the yoke to rotate about said first axis, and the shaft being pivotally connected to the support structure about a horizontal axis which is parallel to the second axis and perpendicularly intersects the first axis, whereby the orientation of the first axis relative to the support structure can be adjusted according to the latitude of the place where the apparatus is to be used.

4. Apparatus as claimed in claim 3 wherein the stem of the yoke is mounted to the side of the socket so that it moves eccentrically with respect to said first axis and wherein heat transfer conduits extend to said light absorbing surface in fixed position generally along the line of said first axis and do not interfere with movement of the yoke.

5. Apparatus as claimed in claim 4 including an elevation servo-motor for controlling rotation of the yoke about said first axis and an azimuth servo-motor for controlling rotation of said support arms about said second axis.

6. Apparatus as claimed in claim 5 wherein the elevation servo-motor is mounted upon said shaft and the azimuth servo-motor is mounted on the yoke.

7. Apparatus as claimed in claim 5 wherein the elevation servo-motor drives a driving gear and said socket has mounted thereon a ring gear which meshes with the driving gear so that operation of the elevation servo-motor causes rotation of the yoke about said first axis, and wherein the drive shaft of the azimuth servo-motor is connected to a first screw-threaded member which is threadably engaged with second screw-threaded member, said second screw-threaded member being connected to said reflector assembly, the arrangement being such that the aximuth servo-motor rotates the first screw-threaded member and thereby causes relative movement between the first and second screw-threaded members and consequently causes the reflector assembly to rotate about said second axis.

8. Solar heating apparatus for heating a heat transfer medium comprising a support structure, a solar energy absorbing surface arranged to transmit heat to a heat transfer medium, focussing means having a principal optical axis, said forcussing means being mounted on said support structure for focussing solar energy upon the solar energy absorbing surface, and tracking means for tracking movement of the sun and for moving the focussing means relative to the support structure to maintain the solar energy focussed upon the solar energy absorbing surface, said tracking means comprising sensing means for sensing mis-orientations between the principal optical axis and the direction of the sun, said sensing means having an optical axis which is arranged to be parallel with the optical axis of the focussing means and including a pair of heat or light sensitive elements disposed on opposite sides of said optical axis, said elements being exposed to a different degree of solar radiation when said optical axis is mis-aligned with the direction of the sun, said sensing means also including shading means, disposed along its optical axis for shading said heat or light sensitive elements in a predetermined manner when the optical axis of the sensing means is directed at the sun and for shading said heat or light sensitive elements in a manner which is different from the predetermined manner when the optical axis of the sensing means is not aligned with the direction of the sun, and drive means responsive to the sensing means and operable to move the focussing means relative to the support structure to a position in which its principal optical axis is aligned with the direction of the sun.

9. Apparatus as claimed in claim 8 wherein the shading means comprises a layer of opaque material spaced from and symmetrically disposed relative to said heat or light sensitive elements.

10. Apparatus as claimed in claim 9 wherein the sensing means further comprises a base upon which the heat or light sensitive elements are mounted and said layer is supported by a support member which extends from the base, said support member having reflective surfaces for reflecting light towards the elements when there is a large deviation between the optical axis of the sensing means and the direction of the sun.

11. Apparatus as claimed in claim 9 wherein the face of the layer of opaque material which faces the heat or light sensitive elements is reflective.

* * * * *